APPARATUS FOR STATIC PULSE REJECTION

Filed Jan. 30, 1950

INVENTOR

MORRIS M. NEWMAN

BY Caswell & Lagaard

ATTORNEYS

Patented Oct. 6, 1953

2,654,835

UNITED STATES PATENT OFFICE 2,654,835

APPARATUS FOR STATIC PULSE REJECTION

Morris M. Newman, St. Paul, Minn., assignor to Lightning & Transients Research Institute, Inc., Minneapolis, Minn., a corporation of Minnesota Application January 30, 1950, Serial No. 141,317

7 Claims. (Cl. 250—20)

My invention relates to apparatus for the elimination of the effects on radio receivers and navigational apparatus of static pulses, such as corona pulses under precipitation static conditions, pulses radiated from lightning discharges and pulses from sparking electric equipment, and has for an object to provide an apparatus whereby the static pulses are blanked out before they reach the receiver and set the receiver circuits into shock excitation.

Another object of the invention resides in providing an apparatus in which the length of the static pulse is effectively shortened to reduce the time of blanking and the corresponding period of signal loss.

A still further object of the invention resides in providing an apparatus in which the desired results are obtained by the use of phased transmission lines to shorten the static pulses.

An object of the invention resides in utilizing transmission lines which are terminated in their characteristic impedances at their input ends and are short circuited at their outer ends and which have an electrical length approximately equal to one quarter of the desired signal carrier wave lengths.

Another object of the invention resides in providing a switching stage in which the receiver is effectively disconnected during the shortened period of the static pulse.

A still further object of the invention resides in providing a switching stage which is balanced to eliminate the introduction of noise into the receiver due to the inherent action of the switching device.

Another object of the invention resides in providing an apparatus in which a control channel for the most part separate from the signal channel leading up to the receiver is employed in which the static pulse is detected and modified.

An object of the invention resides in providing an apparatus in which the static pulse is first shortened in the signal channel, then lengthened a finite amount in the control channel to finally provide a blanking impulse for operating the switching stage.

Another object of the invention resides in providing an apparatus in which the shortened static pulse is reflected back upon itself a certain number of times to form a plurality of formed pulses.

An object of the invention resides in utilizing a cancelling transmission line of definite length to limit the number of formed pulse reflections and to prevent carrier signal resonance of the signal in the reflecting line.

An object of the invention resides in forming from the formed pulses a blanking pulse by inversion and full wave rectification of the formed pulses.

A still further object of the invention resides in providing an apparatus in which the blanking pulse is used to trigger a pulse generator to secure a shaped blanking pulse of definite wave form regardless of the form of the original static pulse.

An object of the invention resides in providing an apparatus in which the signal modified by the shortened pulse is delayed while the pulse is detected and shaped to blank out the pulse from the signal during an interval in which the delayed shortened pulse is arriving at the switching stage.

Another object of the invention resides in providing an apparatus in which a sequence of shortening lines, are employed to provide a short pulse from a variety of wave forms and to cancel pulse residue due to attenuation in the lines.

Other objects of the invention reside in the novel combination and arangement of parts and the circuits therefor hereinafter illustrated and/or described.

The invention herein disclosed comprises an antenna coupling stage which terminates the antenna in its characteristic impedance and which feeds a static pulse shortening transmission line which is terminated at its input end in its characteristic impedance and short circuited at its outer end and which is of an electrical length substantially equal to a quarter wave length of the desired mean signal wavelength within the signal band pass. This transmission line is coupled by a coupling circuit to a cancellation transmission line. This transmission line is terminated at its input end in its characteristic impedance and is short circuited at its outer end. This line is of a length, when chosen for optimum operation equal to an even number of times the length of the first shortening line. A tap is taken on this line to divide the same into two parts, one constituting a delay line for the signal carrier and the other a second shortening line. The signal is picked up at the tap and directed through a switching stage to the receiver. This switching stage utilizes a thermionic tube which is balanced by another thermionic tube, both feeding into a push pull transformer to eliminate the introduction of noise into the receiver due to the inherent action of the switching stage. The cancellation line is connected at its input end by means of a coupling stage to a reflecting transmission line which is of the same electrical length as that of the first shortening line. This line is at its input end kept essentially open and at its other end is short circuited. The input end of the reflecting line is coupled by a coupling stage with an inverter and a pair of rectifiers operating as a full wave rectifier. The output from this rectifier may be directed by means of a manually controlled switch to operate the switching stage in one position for high level pulses of essentially constant magnitude or in its other position to operate a pulse forming stage which in turn operates the switching stage for sporadic pulses of widely varying amplitudes. This latter pulse forming stage includes a limiter and slicer which is connected across the rectifier and which feeds an amplifier. The output of the amplifier is connected to a pulse generator which in turn is adapted to be connected to the switching stage.

Figures 1, 2, 3, 4, 5, 6, 7, 8, 9, 10:
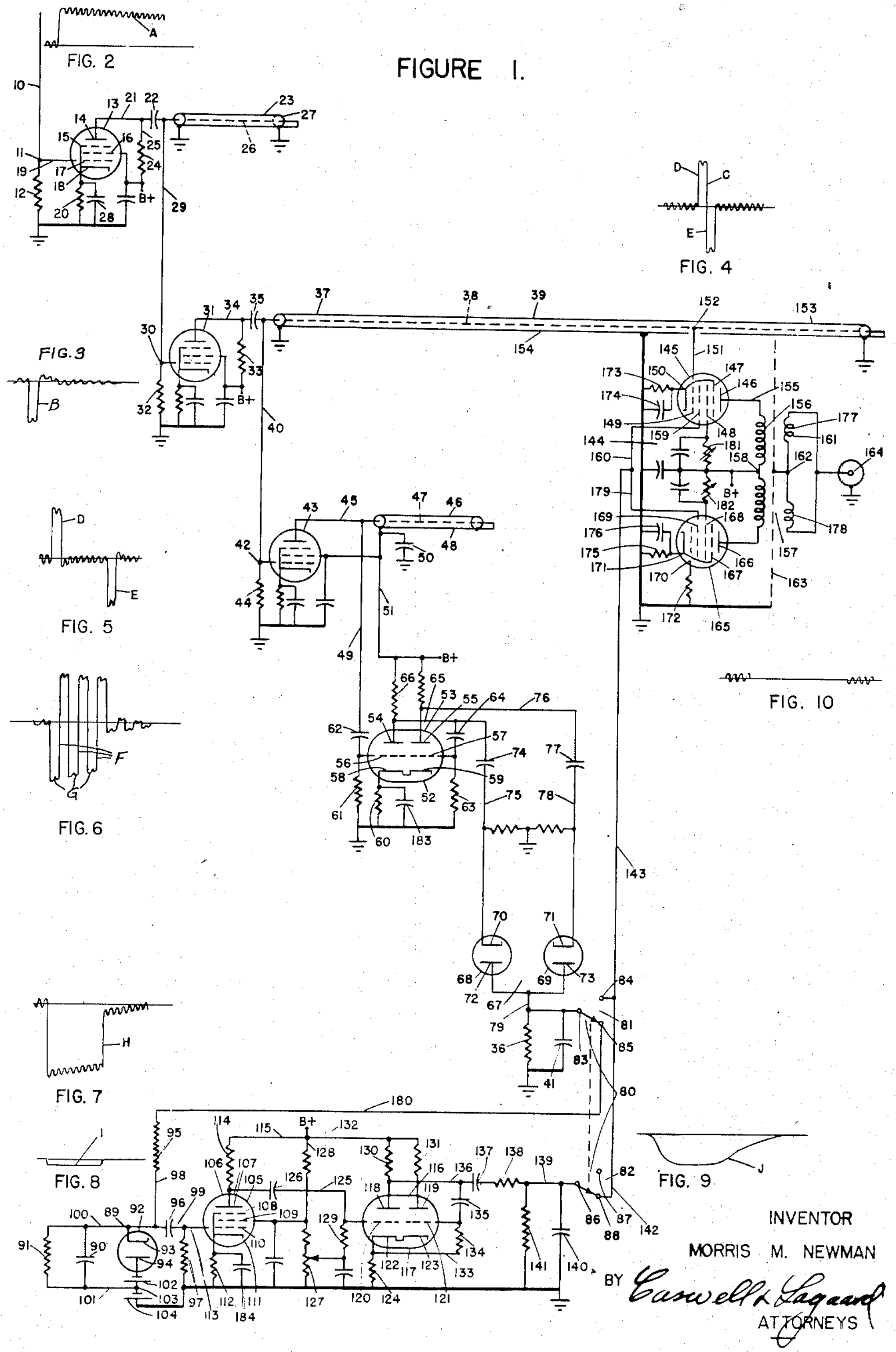
Fig. 1 is a wiring diagram of an apparatus for static pulse rejection illustrating an embodiment of the invention.
Fig. 2 is an oscillogram of the carrier wave on which is superimposed a static pulse as existing at the antenna.
Fig. 3 is a view similar to Fig. 2 showing the wave after the same has passed through the first shortening line.
Fig. 4 is a view similar to Fig. 3 showing the wave as it exists at the second shortening line and at the input to the switching stage.
Fig. 5 is a view similar to Fig. 4 showing the wave after the same has been reflected by the cancellation line.
Fig. 6 is a view similar to Fig. 5 showing the wave after it has been reflected by the reflecting line.
Fig. 7 is a view similar to Fig. 6 of the wave after the same has passed through the inverter and rectifier.
Fig. 8 is a view similar to Fig. 7 showing the wave after it has been limited and sliced by the the limiter and slicer.
Fig. 9 is a view similar to Fig. 8 showing the wave after it has passed through the pulse forming stage.
Fig. 10 is an oscillogram of the wave transmitted to the receiver.

My invention is connected between the antenna and receiver and for the purpose of illustration an antenna indicated at 10 has been shown. This antenna is connected at its output end to a coupling stage 11. This coupling stage includes a resistor 12 which is connected to the output end of the antenna and which is grounded. The said coupling stage further includes a thermionic tube 13 here illustrated as a pentode which has a plate 14, a suppressor grid 15, a screen grid 16, a control grid 17 and a cathode 18. The control grid is connected by means of a conductor 19 with the antenna 10 and resistor 12. The suppressor grid 15 is connected to the cathode 18 which in turn is connected through a cathode resistor 20 by-passed by condenser 28 to ground. The plate 14 is connected through a conductor 21 through a transfer condenser 22 to a first shortening transmission line 23. A terminating resistor 24 is connected through a conductor 25 to the conductor 21 while the said resistor and the screen grid 16 are connected to a suitable source of plate current. The transmission line 23 as illustrated consists of a coaxial cable which may be of a high impedance spiral type and consists of an inner conductor 26 and an outer conductor 27. The conductors 26 and 27 are shorted at the outer ends of the line and grounded. The transmission line 23 is of an electrical length approximately equal to one-fourth of the wave length of the mean wave length of the band to be transmitted. It will be readily comprehended that the length of this line may be varied within limits to move the optimum response point to correspond with any desired signal band.

The transmission line 23 is also connected by means of a conductor 29 to a coupling stage 30. This coupling stage is similar to the coupling stage 11 and the description thereof will not be repeated. This stage includes a pentode 31 and resistors 32 and 33. These resistors are connected to the said pentode in the same manner as the resistor 12 and the resistor 24 of the stage 11. The resistors 24 and 32 have a combined value substantially equal to the characteristic impedance of the transmission line 23. The plate of the pentode 31 is connected by means of a conductor 34 through a transfer condenser 35 to a cancellation transmission line 37. The cancellation line 37 is of the same type as the line 23 and has an inner conductor 38 and an outer conductor 39. The two conductors 38 and 39 are shorted at the outer end of the line 37 and are grounded. The length of the line 37 is equal to an even numbered multiple of the length of the shortening line. In the particular line shown the multiple is six.

The cancellation transmission line 37 is connected by means of a conductor 40 to another coupling stage 42. This coupling stage is similar to the coupling stage 11 and comprises a pentode 43 and a resistor 44. The said pentode and resistor are connected in the same manner as the pentode 13 and resistor 12 are connected in the stage 11. The resistor 44 and the resistor 33 have a combined resistance equal to the characteristic impedance of the cancellation transmission line 37. The plate of the tube 43 is connected by means of a conductor 45 to a reflecting line 46. This reflecting line is of the same type and length as the first shortening line 23. This transmission line has an inner conductor 47 and an outer conductor 48, which are shorted at the outer end of the line. The conductor 47 of line 46 is directly connected to the conductor 45 which in turn is connected to a conductor 49. The outer conductor 48 is by-passed through a condenser 50 to ground and is connected by means of a conductor 51 to a source of plate supply current.

The reflecting line 46 is connected by means of conductor 49 to an inverter 52. This inverter consists of a twin triode 53 which has plates 54 and 55, control grids 56 and 57 and cathodes 58 and 59. The cathodes 58 and 59 are connected together and to a cathode resistor 60 to ground which is by-passed by a condenser 183. The grid 56 is connected to a resistor 61 which is grounded. The said grid and resistor are further connected to a condenser 62 which is connected to the conductor 49. The grid 57 is similarly connected to a grounded resistor 63 and to a condenser 64. Condenser 64 is connected by means of a conductor 65 to the plate 54 which is connected through a plate load resistor 66 to the source of plate current. The inverter 52 feeds into a rectifier 67 which consists of two rectifier tubes 68 and 69. These tubes have cathodes 70 and 71 and plates 72 and 73. The plate 54 of tube 53 is connected by means of the conductor 65 to a condenser 74 which in turn is connected by means of a conductor 75 to the cathode 70 of tube 68. The plate 55 of tube 53 is connected by means of a conductor 76 to a condenser 77 which in turn is connected by means of a conductor 78 to the cathode 71 of tube 69. The two plates 72 and 73 are connected together and to a conductor 79 which is connected to a manually controlled double pole double throw switch 80. This switch has two sections 81 and 82. The section 81 has a movable contact 83 and fixed contacts 84 and 85. The section 82 has a movable contact 86 and fixed contacts 87 and 88. The conductor 79 is connected to the movable contact 83 of section 81 of said switch. The conductor 79 is further connected to a condenser 41 and a resistor 36 which are connected in parallel and grounded. The contact 85 of switch 80 is connected by means of a conductor 180 to a limiter and slicer 89. This limiter and slicer consists of a condenser 90, a resistor 91 and a rectifier tube 92, having a cathode 93 and a plate 94. The said limiter and slicer further includes a resistor 95 and a condenser 96 and still another resistor 97. Resistor 95 is connected by means of a conductor 98 with the condenser 96. This condenser is connected by means of a conductor 99 with the resistor 97 which is grounded. Conductor 98 is connected to another conductor 100 which is connected to the cathode 93 of tube 92 and to the condenser 90 and resistor 91 which are connected in parallel. This condenser and resistor are further connected to a conductor 101. The plate 94 of tube 92 is connected to a source of direct current 102 which is connected by means of a conductor 103 to another source of direct current 104. This latter source of direct current is grounded. The conductor 101 is connected to the conductor 103. The limiter and slicer 89 is connected to an amplifier 105. This amplifier consists of a thermionic pentode 106 including a plate 107, a suppressor grid 108, a screen grid 109, a control grid 110 and a cathode 111. Cathode 111 is connected through a cathode resistor 112 to ground which is by-passed by a condenser 184, while the control grid 110 is connected by means of a conductor 113 to the conductor 99. The plate 107 is connected to a plate load resistor 114 which is connected to a conductor 115 which in turn is connected to a source of plate current.

The amplifier 105 is connected to a trigger pulse generator 116. This generator includes a twin triode 117 having two plates 118 and 119, grids 120 and 121 and cathodes 122 and 123. The cathodes 122 and 123 are connected together and to a cathode resistor 124 which is grounded. The control grid 120 is connected by means of a conductor 125 through a coupling condenser 126 to the plate 107 of amplifier tube 105. Grid bias is furnished for the grid 120 by means of a potentiometer 127 which is connected through a conductor 128 to the source of plate current supply. This potentiometer is connected through a fixed resistor 129 with the conductor 125. Plate current is supplied to the plates 118 and 119 through load resistors 130 and 131 which are connected by means of a conductor 132 to the source of plate current. The cathode 122 of tube 117 is connected by means of a conductor 133 to a resistor 134 which is connected to the grid 121 of said tube. The said grid is further connected to a condenser 135 which is connected to the plate 118 by means of a conductor 136. This conductor is connected to a condenser 137 which in turn is connected to a resistor 138. This resistor is connected by means of a conductor 139 with the movable contact 86 of switch section 82 of switch 80. A condenser 140 and a resistor 141 are connected to the conductor 139 and to ground. The fixed contact 88 of switch section 82 is connected by means of a conductor 142 with the fixed switch contact 84 of switch section 81 which in turn is connected by means of a conductor 143 with a switching stage 144.

The switching stage 144 includes a converter tube 145 having a plate 146, a suppressor grid 147, a screen grid 148, a cut-off grid 159, a control grid 149 and a cathode 150. The cathode 150 is grounded through a bias resistor 173 which is bi-passed by a condenser 174. The control grid 149 of this tube is connected by means of a conductor 151 to a tap 152 on the conductor 38 of the transmission line 37. This tap divides the transmission lines 37 into two parts, the one part being designated by the reference numeral 153 and forming a second shorting line and being that part nearest the shorted end of the said transmission line. The said tap further forms another part in said line adjacent the input end of the line and which forms a signal delay line indicated by the reference numeral 154. The plate 146 of the tube 145 is connected by means of a conductor 155 with the primary 156 of a push pull transformer 157. This primary has a center tap 158 which is connected to a suitable source of plate current. The cut-off grid 159 is connected to the conductor 143 by means of a conductor 160. The secondary 161 is provided with a center tap 162 which is connected to a screen 163 between the said primary and secondary and which is grounded. The ends of the said secondary are connected together and to a conductor 164 which is adapted to be connected to the antenna terminal of the receiver. By means of this construction the secondary 161 is divided into two sections 177 and 178 which are wound in opposite directions and which are connected in parallel across the conductor 164 and the screen 163.

The switching stage 144 further includes a balancing tube 165 which is identical with the tube 145. This tube has a plate 166, a suppressor grid 167, a screen grid 168, a cut-off grid 169, a control grid 170 and a cathode 171. The cathode 171 is grounded through a bias resistor 175 which is by-passed by a condenser 176, while the control grid 170 is connected through a dummy resistor 172 to ground. The cut-off grid 169 is connected by means of a conductor 179 to the conductor 143.

The operation of the invention is as follows: For the purpose of describing the operation of the invention it will be assumed that an exponental pulse has been superimposed on the carrier signal frequency and has been received by the antenna. An oscillogram showing a wave representing the potential of the combined pulse and carrier wave which is indicated by the reference character A is shown in Fig. 2. The wave is prevented from reflecting back and forth on the antenna and lengthening itself by the antenna being terminated in resistor 12 which has a resistance value equal to the characteristic impedance of the antenna. The tube 13 transfers this potential shown in Fig. 2 to the first shortening line 23. This first shortening line reflects this wave of Fig. 2 from the shorted end once and further reflections are prevented by the input end of the line being terminated in the resistor 24 having a resistance in combination with resistor 32 in parallel with it equal to the characteristic impedance of the first shortening line 23. The resultant potential at the grid of tube 31 is then as shown in Fig. 3, and is represented by the lobe B. The length of the line 37 is such that the desired signal is not materially reduced. A signal for which the electrical line length is a quarter wave length will by the reflection be increased by a factor of two. A signal for which the length is a half wave length will be cancelled. Most of the region of the signal between those two will be transmitted in useable fashion by the line with optimum energy transfer in a wide band width about the first frequency for which the line is a quarter wave length. On the other hand, for a static pulse which is of long duration the reflection essentially eliminates all but the first portion of length equal to twice the electrical length of the transmission line. However, because many static pulses are rectangular in shape as the above mentioned long pulse and also because of the attenuating effect of transmission lines producing a slightly smaller canceling reflection than the original pulse which results in a residue potential after the first shortened section, it is necessary to utilize at least one more shortening line. For this purpose the shortening line 153, being a part of the cancellation line 37, is employed to reduce the initial wave shown in Fig. 2 to that showing the shortened pulse C in Fig. 4 which has two lobes D and E. This shortened pulse would still cause considerable interference applied directly to the receiver so it is essentially blanked by passing through the switching stage tube 145 which is biased to cut off during the time this shortened impulse is present by means of a controlled blanking pulse derived from the original static pulse shown in Fig. 2. The delay line 154 forming a part of the cancellation line 37 provides a time delay for passing the signal to the switching stage in order that there will be sufficient time for the static pulse to be detected and formed into a final blanking pulse arriving at the switching stage just prior to and overlapping the time interval in which the shortened static pulse C of Fig. 4 is arriving at tube 145. The potential at the input end of the cancellation line 37 differs from that shown in Fig. 4 by having a separation between the two lobes D and E equal to twice the electrical length of the cancellation line 37 as shown in Fig. 5 which in turn is applied through tube 43 to the reflecting line 46. This reflecting line is essentially open circuited at the input end and short circuited at its outer end so that the pulses reflect back and forth. The lobe D of Fig. 5 thus reflects back and forth until further reflections are cancelled by the incoming pulse produced by the cancellation line, thus producing a definite number of pulses F as shown in Fig. 6. The cancellation line length is an even numbered multiple of the reflecting line length which in turn is equal in length to the length of the first shortening line 23. The multiple number determines the number of pulses F in Fig. 6. These pulses of Fig. 6 are in turn applied to the inverter 52 which amplifies and inverts the positive lobes G of the pulses C to provide full wave rectification through the rectifier tubes 68 and 69 resulting in the negative pulse H of Fig. 7. The condenser 41 and resistor 36 combination have such time constants as do not appreciably broaden the pulse produced by the inverter 52 and rectifier 67, thus producing the pulse H of Fig. 7. This pulse I have termed a blanking pulse as it may be used to go directly to the switching stage 144 to cut off tube 145 as previously stated. When the switch 80 is in its upper position this blanking pulse would be so used which is desirable when the nature of the static pulses arriving are of high level, large in number, and relatively uniform, because in such case as many as 500,000 static pulses may be blanked out per second which is many times greater than is possible with other noise limiters commonly used within the receiver and functioning after the receiver circuits have been set into shock excitation. To prevent the cut off of switching tube 145 from producing noise by virtue of cessation of plate current in that tube, the balancing tube 165 is also cut off at the same time by the same blanking pulse and its output is coupled in opposition to that of the signal control tube 145 resulting in cancellation of the effect of plate current changes. Normal signal plate variations in tube 145 are passed on to the receiver since the balancing tube control grid being connected to dummy resistor 172 does not cancel the signal. Since the switching stage operates at micro-volt levels, ahead of the receiver tuned circuits it is essential that very careful balancing be accomplished in this stage to prevent switching noise. The output transformer 157 must be carefully balanced and to accomplish transfer from push pull to single ended feed to the receiver the output transformer secondary is constructed with two windings which are arranged to produce opposing voltages and are connected in parallel so that the mid point may be grounded and complete electrical balance is maintained. An electrostatic shield is provided between the windings to prevent electrostatic energy transfer in the switching stage. The resulting potential after the switching stage has functioned and directed to the receiver is shown in Fig. 10. In the case where the static pulses are sporadic and widely varying in voltage amplitudes the blanking pulse H of Fig. 7 would also vary and produce erratic operation of the switching stage for lower level static pulses. Therefore, in such case the switch 80 would be moved to its lower position whereby the slicer and limiter 89 would become effective which shapes and limits the pulse H of Fig. 7 by forming a uniform trigger pulse I which is shown in Fig. 8. This trigger pulse is amplified by amplifier 105 and modified by the trigger pulse generator 116 resulting in the formed pulse J shown in Fig. 9.

The advantages of the invention are manifest. The apparatus operates before the signal is received at the receiver tuning circuits thereby preventing amplification of the static pulse within the receiver by shock excitation. This allows a very large number of pulses to be blanked out without interfering with the desired signal. With the instant invention reconstruction and alteration of the receiver need not be made. The circuit elements which detect and form the blanking pulse are for the most part separate from the signal generator and thus do not modify the signal. With this invention more perfect elimination of noises can be procured than where the noise is merely reduced in volume within the receiver. For instance, wave corona pulses may be removed from an antenna, when an airplane is flying in precipitation static or thunder storm conditions causing various parts of the airplane to go into corona, producing pulse repetition of the order of 100,000 per second. Noise limiters within the receiver which function after the receiver circuits have been set to shock excitation would pass no signal as they would be limiting practically all the time on the shock excitation broadened pulses under such circumstances.

Changes in the specific form of the invention, as herein described, may be made within the scope of what is claimed without departing from the spirit of the invention.

Having described the invention, what is claimed as new and desired to be protected by Letters Patent is:

1. In apparatus for static pulse rejection for radio receivers, an antenna, energy transferring means coupled to the antenna and to the receiver and including a switch connected to the antenna circuit of the receiver and adapted upon actuation to disconnect the receiver from the antenna, a pulse shortening transmission line shorted at its outer end and terminated at its input end in an impedance substantially equal to its characteristic impedance, a coupling device connected to said antenna and to said transmission line at its input end, said energy transferring means being connected to said input end, said transmission line shortening long static pulses arriving at said transmission line, and control means coupled to the input end of said transmission line and coupled to said switch for operating said switch to blank out the static pulses prior to arrival at said receiver.

2. In apparatus for static pulse rejection for radio receivers, an antenna, energy transferring means coupled to the antenna and to the receiver and including a switch coupled to the antenna circuit of the receiver and adapted upon actuation to disconnect the receiver from the antenna, a pulse shortening transmission line of a length substantially equal to a quarter wave length of the optimum signal frequency desired, said transmission line being shorted at its outer end and terminated at its input end in an impedance substantially equal to its characteristic impedance, a coupling device connected to said antenna and to said transmission line at its input end, said energy transferring means being connected to said input end, said transmission line shortening long static pulses arriving at said transmission line, and control means coupled to the input end of said transmission line and coupled to said switch for operating said switch to blank out the static pulses prior to arrival at said receiver.

3. In apparatus for static pulse rejection for radio receivers, an antenna, energy transferring means coupled to the antenna and to the receiver and including an electronic switch connected to the antenna circuit of the receiver and adapted upon actuation to disconnect the receiver from the antenna, a pulse shortening transmission line shorted at its outer end and terminated at its input end in an impedance substantially equal to its characteristic impedance, a coupling device connected to said antenna and to said transmission line at its input end, said energy transferring means being connected to said input end, said transmission line shortening long static pulses arriving at said transmission line, delay means, a coupling device connected to the delay means and to the transmission line, said delay means delaying the arrival of the shortened pulse at the receiver, a second transmission line of a length equal to an even numbered multiple of the length of the first transmission line, said delay means being a portion of said second transmission line, said second transmission line being shorted at its outer end and terminated at its input end in an impedance substantially equal to its characteristic impedance, a coupling device connected to the first named transmission line and to the input end of said second transmission line, said second transmission line forming from said shortened pulse two pulses of opposite polarity spaced in time from one another, a third transmission line of the same length as said first transmission line, shorted at its outer end and effectively open circuited at its input end, a coupling device connected to said second transmission line and to the input end of said third transmission line, said third transmission line in conjunction with said second transmission line producing a definitely limited sequence of pulses of both polarities, rectifying means coupled to said third transmission line at its input end and rectifying said pulses to produce a single blanking pulse of predetermined time extent and polarity and means for connecting the output portion of said rectifying means to said switch.

4. In apparatus for static pulse rejection for radio receivers, an antenna, energy transferring means coupled to the antenna and to the receiver and including a switch connected to the antenna circuit of the receiver and adapted upon actuation to disconnect the receiver from the antenna, a pulse shortening transmission line of a length substantially equal to an odd number of quarter wave lengths of the optimum signal frequency desired, said transmission line being shorted at its outer end and terminated at its input end in an impedance substantially equal to its characteristic impedance, a coupling device connected to said antenna and to said transmission line at its input end, said transmission line shortening long static pulses arriving at said transmission line, and control means connected to the input end of said transmission line and to said switch and operating said switch to blank out the static pulses prior to arrival at said receiver.

5. In apparatus for static pulse rejection for radio receivers, an antenna, a resistor effectively equal to the surge impedance of the antenna and terminating said antenna, energy transferring means coupled to the antenna and to the receiver and including a switch connected to the antenna circuit of the receiver and adapted upon actuation to disconnect the receiver from the antenna, a pulse shortening transmission line shorted at its outer end and terminated at its input end in an impedance substantially equal to its characteristic impedance, a coupling device connected to said antenna and to said transmission line at its input end, said transmission line shortening long static pulses arriving at said transmission line and control means connected to the input end of said transmission line and to said switch and operating said switch to blank out the static pulses prior to arrival at said receiver.

6. In apparatus for static pulse rejection for radio receivers, an antenna, energy transferring means coupled to the antenna and to the receiver and including a switch connected to the antenna circuit of the receiver and adapted upon actuation to disconnect the receiver from the antenna, a pulse shortening transmission line shorted at its outer end and terminated at its input end in an impedance substantially equal to its characteristic impedance, coupling means connected to the antenna and to said transmission line at its input end, said transmission line shortening long static pulses arriving at said energy transferring means, a second coupling means, modifying means including reflecting means connected to the input end of said transmission line through said second coupling means and forming a predetermined number of reflected pulses from the shortened pulse produced by said transmission line, a rectifier coupled to said modifying means and forming a blanking pulse of predetermined polarity from said reflected pulses, and means including said rectifier connected to said modifying means and to said switch for operating said switch from said blanking pulse.

7. In apparatus for static pulse rejection for radio receivers, an antenna, energy transferring means coupled to the antenna and to the receiver and including a switch connected to the antenna circuit of the receiver and adapted upon actuation to disconnect the receiver from the antenna, a pulse shortening transmission line shorted at its outer end and terminated at its input end in an impedance substantially equal to its characteristic impedance, coupling means connected to the antenna and to said transmission line at its input end, said transmission line shortening long static pulses arriving at said energy transferring means to form shortened pulses, a second coupling means, cancellation means connected to the input end of said transmission line through said second coupling means, said cancellation means being shorted at its outer end and terminated at its input end in an impedance substantially equal to its characteristic impedance, a third coupling means connected to the input end of said cancellation means, reflecting means connected to the output of said third coupling means, said cancellation means and said reflecting means cooperatively functioning to form a plurality of reflected pulses from said shortened pulses and to simultaneously limit the number of said reflected pulses, a rectifier coupled to said reflecting means and forming a blanking pulse of predetermined polarity from said reflected pulses, and means connected to said blanking means and to said switch for operating said switch from said blanking pulse.

MORRIS M. NEWMAN.

References Cited in the file of this patent

UNITED STATES PATENTS

| Number | Name | Date |
|---|---|---|
| 2,151,145 | Percival | Mar. 21, 1939 |
| 2,151,739 | Burrill | Mar. 28, 1939 |
| 2,151,774 | Koch | Mar. 28, 1939 |
| 2,225,524 | Percival | Dec. 17, 1940 |
| 2,236,134 | Gloess | Mar. 25, 1941 |
| 2,450,352 | Piety | Sept. 28, 1948 |
| 2,531,164 | Sands et al. | Nov. 21, 1950 |

FOREIGN PATENTS

| Number | Country | Date |
|---|---|---|
| 442,626 | Great Britain | Feb. 12, 1936 |